(12) United States Patent
Wang et al.

(10) Patent No.: US 6,228,939 B1
(45) Date of Patent: May 8, 2001

(54) THERMOREVERSIBLE GELS COMPRISING NEAR GELATION POLYMERS

(75) Inventors: Xiaorong Wang; Victor J. Foltz, both of Akron, OH (US)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/314,745

(22) Filed: May 19, 1999

(51) Int. Cl.$^7$ .............................. C08L 53/02; C08L 51/00
(52) U.S. Cl. ................................ 525/71; 525/74; 525/78
(58) Field of Search .................... 525/71, 74, 78

(56) References Cited

U.S. PATENT DOCUMENTS

| | | |
|---|---|---|
| 3,244,664 | 4/1966 | Zelinski et al. . |
| 3,281,383 | 10/1966 | Zelinski et al. . |
| 3,594,452 | 7/1971 | De La Mare et al. . |
| 3,970,608 | 7/1976 | Furukawa et al. . |
| 3,985,830 | 10/1976 | Fetters et al. . |
| 4,104,332 | 8/1978 | Zelinski . |
| 4,304,886 | 12/1981 | Bean, Jr. et al. . |
| 5,008,324 | 4/1991 | Killgoar, Jr. et al. . |
| 5,225,498 | 7/1993 | Sorathia et al. . |
| 5,494,981 | 2/1996 | Gorodisher et al. . |
| 5,670,006 | 9/1997 | Wilfong et al. . |

*Primary Examiner*—Mark L. Warzel
(74) *Attorney, Agent, or Firm*—David G. Burleson; Daniel N. Hall; Scott A. McCollister

(57) ABSTRACT

The present invention relates to the use of polymers near their gelation point as additives to hydrogenated block copolymers to form thermoreversible gels. More particularly, the compositions of this invention are elastomeric and exhibit improved damping capabilities over a wide temperature range and frequency range due to the addition of a novel near-gelation polymer damping additive.

20 Claims, 1 Drawing Sheet

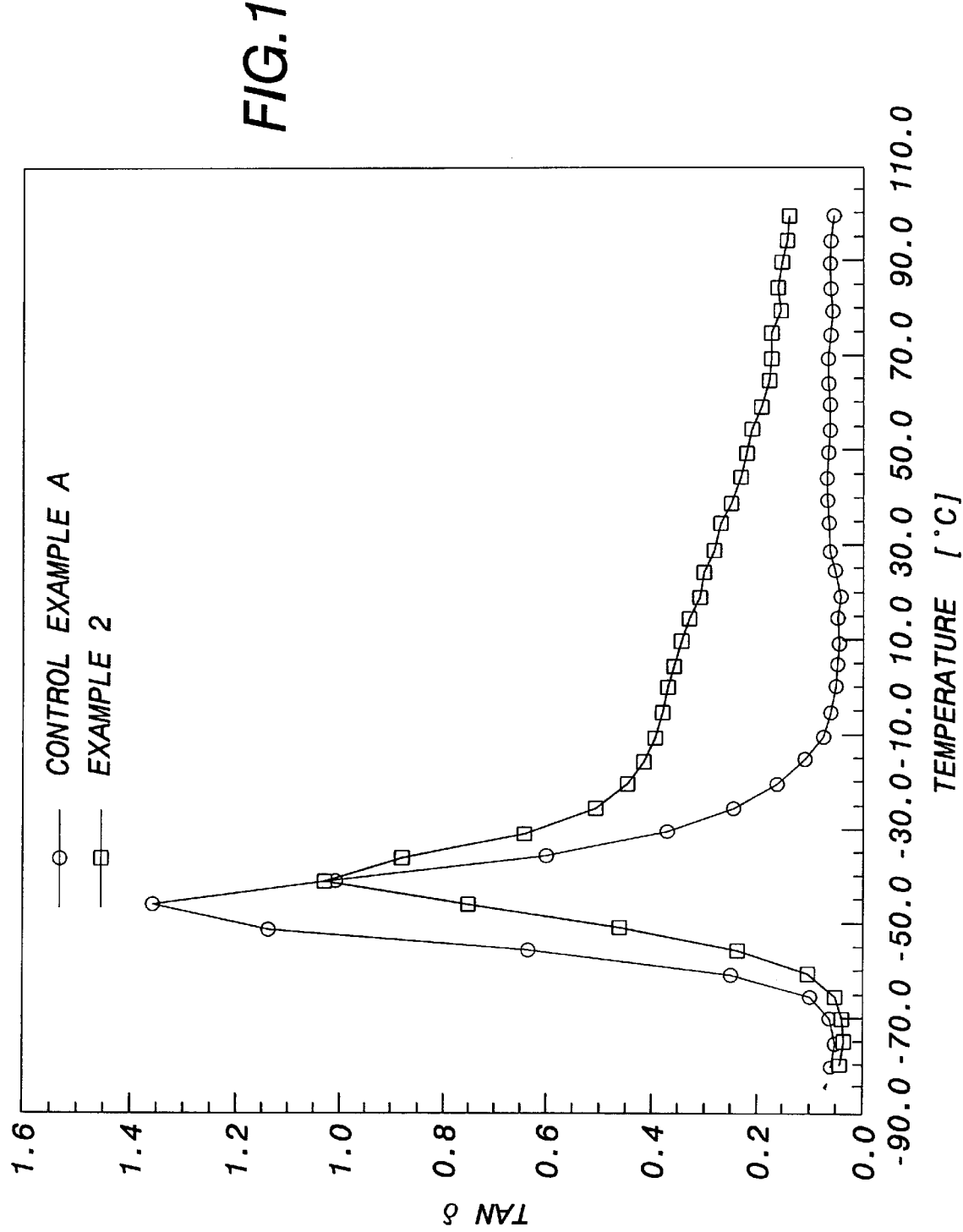

THERMOREVERSIBLE GELS COMPRISING NEAR GELATION POLYMERS

FIELD OF THE INVENTION

This invention is generally directed to compositions of soft matter that are useful for damping purposes. More particularly, the compositions of this invention are elastomeric and exhibit improved damping capabilities over a wide temperature range and frequency range due to the addition of a novel damping additive. The present invention relates to the use of polymers near their gelation point as additives to hydrogenated block copolymers to form thermoreversible gels.

BACKGROUND OF THE INVENTION

Damping is the absorption of mechanical energy by a material in contact with a source of mechanical energy. A convenient measurement of the damping is the determination of the tan δ of the damping material. In common practices, the tan δ of a material can be adjusted by varying, broadening or adding to the glass transition peak at the desired temperature range.

Several specific materials have been employed for damping. U.S. Pat. No. 5,494,981 teaches a composition containing resins that are cured in sequential fashion by using a single catalyst, which is a Bronsted acid, that activates an epoxy resin component, then activates cyanate trimerization into poly(triazines). The composition provides a damping (glass transition) peak around 100 E C. The compositions disclosed in this patent are taught to be heat stable over a temperature range of about 0° to at least 300° C.

U.S. Pat. No. 5,008,324 teaches a composition that comprises a crosslinked elastomer and a multi-phase thermoplastic elastomeric polymer. The multi-phase thermoplastic elastomeric polymer has at least two polymeric phases including an initial linear or lightly linked polymeric phase and a second polymeric phase in the form of discrete domains dispersed within the initial polymeric phase. The initial polymer phase provides a glass transition damping peak around 10 to 70° C.

U.S. Pat. No. 5,225,498 teaches a damping material that includes an interpenetrating polymer network having a soft polymer component made of polyurethane and a hard polymer component made of a vinyl ester polymer. The polyurethane and the vinyl ester polymer are polymerized in the presence of one another and cured at room temperature. The interpenetrating polymer network is taught to have an acoustic damping factor in excess of 0.2 over a temperature range of from about 15 to 85° C., with glass transition damping peak at about 55° C.

U.S. Pat. No. 5,670,006 teaches a composition for vibration damping that includes an acrylate-containing thermoset resin that includes an interpenetrating network of polymerized epoxy monomer and polymerized acrylate monomers. The epoxy-acrylate thermoset resin is taught to have a glass transition temperature in the range of about −2° C. to about 200° C. at 1 Hz.

It is particularly desirable to develop high damping additives that are effective over a wide range of temperatures and frequencies without involving glass transition peaks. Also, it is important to blend the additives with hydrogenated block copolymers to form a thermoreversible polymer gel having high damping properties.

BRIEF DESCRIPTION OF THE DRAWINGS

FIG. 1 displays a comparison of the tan δ versus temperature for the polymers prepared in Control Example A and Example 2.

OBJECTS AND SUMMARY OF THE INVENTION

It is an object of the invention to develop thermoreversible gels having high damping properties.

It is a further object of the invention to utilize near-gelation polymers as compounding additives to develop thermoreversible gels having high damping properties.

The present invention provides for the use of near-gelation polymers as additives to hydrogenated block copolymers to produce thermoreversible gels having high damping properties.

DETAILED DESCRIPTION OF THE INVENTION

The present invention is directed to the use of near-gelation polymers as additives to hydrogenated block copolymers to produce thermoreversible gels having high damping properties.

The gelation point of a polymer occurs when a polymer is transformed from a liquid to a solid. This transition can be effected by the addition of a crosslinking agent to a liquid polymer having pendant or terminal functional groups that are capable of being crosslinked with the crosslinking agent. The amount of crosslinking that occurs directly correlates to the degree of gelation of the polymer. A liquid polymer treated with a small amount of crosslinking agent may transform into a gel while the addition of a substantial molar percentage of a crosslinking agent may result in the formation of a solid polymer.

In practicing the present embodiment, the skilled artisan should determine the gel point of the polymeric composition that is employed to create the near-gelation polymer. For purposes of this specification, the polymeric composition that is employed to create the near-gelation polymer may be referred to as the prepolymer system.

Although the gel point can be discussed in terms of a number of parameters, it is convenient to determine the weight of curative to weight of prepolymer necessary to reach the gel point. Thus, the gel point can be represented by the weight of curative necessary to reach gelation, $W_{curative-gel}$, over the weight of the prepolymer, $W_{prepolymer}$.

Likewise, the point of complete cure can be represented by the equivalent weight of curative necessary to reach complete cure, $W_{curative-complete}$, over the equivalent weight of the prepolymer $W_{prepolymer}$. In general, therefore, the extent of any curing reaction can be represented by the weight of curative added, $W_{curative}$, over the weight of the prepolymer, $W_{prepolymer}$. For purposes of this specification, the extent of reaction, r, can be represented by the weight of curative, $W_{curative}$, over the weight of the prepolymer, $W_{prepolymer}$; i.e., $r = W_{curative}/W_{prepolymer}$. Therefore, $r_{gel} = W_{curative-gel}/W_{prepolymer}$, which is the extent of reaction at the gel point.

Thus once the gel point of the prepolymer is determined; an appropriate amount of curative is added and reacted with the prepolymer to achieve a near-gelation polymer. When selecting an appropriate amount of curative, those practicing the present invention should preferably attempt to approach the gel point without exceeding the gel point; although it should be understood that the definition of near-gelation polymers broadly includes those reaction products of curative and prepolymer that exceed the gel point without actually reaching complete cure. Thus, in the preferred embodiment, the weight ratio that is employed to create a near-gelation polymer is based on the following formula:

$$E = \left| \frac{r - r_{gel}}{r_{gel}} \right|$$

where E is the relative distance to the gel point, r is the extent of reaction and $r_{gel}$ is the extent of the reaction at the gel point. Generally, E should be less than or equal to 1, preferably less than about 0.5, more preferably less than about 0.2 still more preferably less than about 0.1, and even more preferably equal to or less than 0.05.

For example, where one determines the gel point of particular polymeric composition to be about 0.5 parts of curative per part of prepolymer, a near-gelation polymer can be obtained by reacting the polymeric composition with about 0.3 parts of curative per part of prepolymer. In this case, the relative distance E equals (|0.3–0.5|)/(0.5)=0.4.

There are several techniques known in the art for estimating the gel point of polymeric compositions. Experimentally, the gel point can be determined by solvent extraction. This procedure is set forth in *Principles of Polymer Chemistry*, by Paul J. Flory. Other experimental procedures are also set forth therein. The skilled artisan will also appreciate that the gel point can be approximated by using theoretical calculations. In this regard, *Principles of Polymerization, Third Edition*, by George Odian, John Wiley & Sons, Inc., 1991, pp. 108–123, and *Principles of Polymer Chemistry*, by Paul J. Flory, pp. 46–47, are incorporated herein by reference.

Suitable hydrogenated block copolymers for use in the present invention include but are not limited to: styrene-ethylene/butylene-styrene block copolymer (SEBS), styrene-ethylene/butylene block copolymer (SEB), styrene-ethylene/propylene-block copolymer (SEP), styrene-ethylene/propylene-styrene block copolymer (SEPS), styrene-ethylene/propylene-ethylene block copolymer (SEPE), styrene-ethylene/butylene-ethylene block copolymer (SEBE), styrene-ethylene/styrene block copolymer (SES), ethylene-ethylene/butylene block copolymer (EEB), ethylene-ethylene/butylene/styrene block copolymer (hydrogenated BR-SBR block copolymer), ethylene-ethylene/butylene/styrene-ethylene block copolymer (hydrogenated BR-SBR-BR block copolymer), ethylene-ethylene/butylene-ethylene block copolymer (EEBE) and the like and mixtures thereof. The preferred hydrogenated block copolymer for use in the present invention is styrene-ethylene/propylene-styrene block copolymer (SEPS).

The hydrogenated block copolymers of the above structures used in the present invention have a number average molecular weight in a range of from 5,000 to 1,000,000, preferably from 50,000 to 800,000, more preferably 70,000 to 500,000, and the molecular weight distribution ratio (Mw/Mn) of weight average molecular weight (Mw) to number average molecular weight (Mn) is 10 or less. The molecular structure type of the hydrogenated block copolymer may be any of straight-chain, branched involving partial coupling with a coupling agent, such as, radial, comb-like and the star-shaped types and combinations thereof.

There is no limitation to a method for producing these hydrogenated block copolymers, so far as they have the structure described above. These copolymers can be obtained by synthesizing a vinyl-substituted aromatic hydrocarbon/conjugated diene block copolymer in an inert solvent using an organo-lithium and if necessary, a 1,2-vinyl bond modifier such as ether compounds, tertiary amines, etc. according to the methods, for example, disclosed in British Patent No. 1,130,770 and U.S. Pat. Nos. 3,281,383 and 3,639,517, and then hydrogenating the resulting block copolymer according to the well-known methods, for example, disclosed in British Patent No. 1,020,720 and U.S. Pat. Nos. 3,333,024 and 4,501,857. In this case, the polymer block composed mainly of the conjugated diene can be changed in form to the polymer block of an olefinic compound by hydrogenating at least 80 mole % of the aliphatic double bond coming from the conjugated diene of the vinyl-substituted aromatic hydrocarbon/conjugated diene block copolymer.

The term "near-gelation polymer" or "near-gelloid" is used herein to include any polymers in a physical state relative to the gelation point of the polymer wherein the absolute value of $$E = \left| \frac{r - r_c}{r} \right|$$

ranges from 0 to 0.5; wherein r is the weight ratio of the crosslinking agent to the functionalized prepolymer and $r_c$ is the critical ratio of weight of the crosslinking agent to the weight of the functionalized prepolymer at the gelation point.

Near-gelation polymers are formed from the reaction of a crosslinking agent and a liquid prepolymer capable of obtaining a near-gelation state. The prepolymer has a functionality ($f_a$) of $f_a \geq 2$, preferably $10 \geq f_a \geq 2$, most preferably $5 \geq f_a \geq 2$. The molecular weight ($M_f$) of the prepolymer per functional group is defined as $M_f = M_n/f_a$, wherein $M_n$ is the number average molecular weight of the prepolymer. In general, $M_f$ can range from 100 to 100,000, however, we prefer $M_f \leq M_e$, wherein $M_e$, called the entagment molecular weight, is the molecular weight of 100 repeating monomer units of the prepolymer.

Suitable prepolymers include but are not limited to functionalized elastomeric polymers obtained by introducing a functional group onto the elastomeric polymers. Representative specific examples of the functionalized elastomeric polymers that can be modified to include crosslinkable functional groups include but are not limited to: styrene-butadiene copolymers and its hydrogenation product; polyisoprene, nitrile rubber and its hydrogenation product; chloroprene rubber, butyl rubber, ethylene-propylene rubber, ethylene-propylene-diene rubber, ethylene-butene rubber, ethylene-butene-diene rubber, acrylic rubber, α,β-unsaturated nitrile-acrylate-conjugated diene copolymer rubber, chlorinated polyethylene rubber, fluororubber, silicone rubber, urethane rubber, polysulfide rubber, styrene-butadiene block copolymer and its hydrogenation product, and the like. Among these rubbery polymers, more preferable are essentially saturated rubbers and rubbers having a low unsaturation degree such as hydrogenation product of styrene-butadiene rubber, hydrogenation product of nitrile rubber, ethylene-propylene rubber, ethylene-propylene-diene rubber, ethylene-butene rubber, ethylene-butene-diene rubber, acrylic rubber, chlorinated polyethylene rubber, fluororubber, silicone rubber, urethane rubber, polysulfide rubber, hydrogenation product of styrene-butadiene block polymer, α,β-unsaturated nitrile-acrylate-conjugated diene copolymer rubber and the like modified by introducing a crosslinkable functional group into the above rubbers.

Suitable functional groups on the prepolymers or functionalized elastomeric polymers include any functional groups that are reactive with a conventional crosslinking agent well known to those skilled in the art. Unsaturated double bonds also can be regarded as the functional groups. In addition, the block copolymers can also be functionalized by reacting the terminal blocks containing unsaturated groups with various reagents to produce functional groups, such as hydroxyl, epoxy, sulfonic acid, mercapto acrylate or carboxyl groups. The crosslinking of the functionalized polymers of this invention is conducted in a conventional manner by contacting the polymer with a suitable crosslinking agent or a combination of such agents. Functionalization methods are well known in the art. The functional groups can be used to produce both covalent and ionic crosslinks. Crosslinking may be effected by any conventional crosslinking means, preferably UV means, irradiation means or by chemical means. Electron beam, or the like treatment can accomplish radiation crosslinking.

The crosslinking agent should have a functionality, $f_b \geq 2$, preferably $10 \geq f_b \geq 2$, most preferably $5 \geq f_b \geq 2$. One type of crosslinking agent employed in forming branched polymers is a tri- or di-halo alkane such as tri- or di-bromoethane. Another coupling agent or crosslinking agent employed in making branched polymers is phenyl benzoate as disclosed in U.S. Pat. No. 3,766,301. Branched polymers can also be formed by employing coupling agents or crosslinking agents having more than three reactive sites. Examples of such coupling agents include among others: $SiCl_4$ in U.S. Pat. No. 3,244,664; polyepoxides, polyisocyanates, polyimines, polyaldehydes, polyketones, polyanhydrides, polyesters, and polyhalides in U.S. Pat. No. 3,281,383. Other examples of crosslinking agents are diesters in U.S. Pat. No. 3,594,452; methoxy silanes in U.S. Pat. No. 3,880,954; divinyl benzene in U.S. Pat. No. 3,985,830; and 1,3,5-benzenetricarboxylic acid trichloride in U.S. Pat. No. 4,104,332. Each of these patents is hereby incorporated by reference.

Suitable crosslinking agents or promoters can be incorporated to encourage radiation crosslinking such as triallylcyanuate and triallyliso-cyanuate. Suitable chemical crosslinking agents can be chosen based on the individual polymer or polymers used. For example, a phenolic resin or p-quinone dioxime can be used to cure butyl rubber, peroxide can be used to cure EPDM or diisocyanate dimer acid can be used to cure epichlorohydrin rubber. The epoxy-containing polymers may also be crosslinked by the addition of multifunctional carboxylic acids, acid anhydrides, and alcohols, and in general by the curing methods described in U.S. Pat. No. 3,970,608, which is incorporated by reference. The hydroxy containing polymers may also be crosslinked by the addition of multifunctional carboxylic acids or acid anhydrides.

While the prepolymer and the crosslinking agent used to form the near-gelation polymer may contain any reactive functional groups, the most common functional reactive groups include but are not limited to:

| Functional group A | Functional group B | Chemical bond formed |
|---|---|---|
| —OH | —COOH | ester |
| —NH$_2$ | —COOH | amide |
| —NCO | —OH | urethane |
| —NCO | —NH$_2$ | urea |
| oxirane | —NH$_2$ | epoxy |
| succinyl oxide | —NH$_2$ | imide |

It is preferred to use prepolymers and crosslinking agents that do not create small molecule by-products during the reaction. Preferred reactions are urethane and epoxy reactions.

The reaction of functional groups of the prepolymer and crosslinking agent are not limited to the reactions of the functional groups listed above. Any prepolymer having functional groups capable of being reacted with functional groups on a crosslinking agent can be utilized in the present invention.

In the composition of this invention, the proportions of the hydrogenated block copolymer (I) and the near-gelation crosslinked thermoplastic resin and/or near gel crosslinked rubbery polymer (II) blended are such that the amount of the hydrogenated block copolymer (I) is 1 to 99 parts by weight, preferably 10 to 90 parts by weight and more preferably 30 to 70 parts by weight and the amount of the near gel crosslinked thermoplastic resin and/or rubbery polymer (II) is 99 to 1 part by weight, preferably 90 to 10 parts by weight, and more preferably 70 to 30 parts by weight, provided that (I)+(II)=100 parts by weight. When the amount of the near gel crosslinked thermoplastic resin and/or rubbery polymer (II) is less than 1 parts by weight, the damping-improving effect of the near gel crosslinked thermoplastic resin and/or rubbery polymer (II) on the hydrogenated block copolymer (I) becomes insufficient. When the amount of the hydrogenated block copolymer (I) is less than 1 part by weight, the resulting blend becomes insufficient in strength.

The damping copolymer blend contains a mixture near-gelation polymer and hydrogenated copolymer blend has a tan δ ranging from 0.3 to 1.0 at a temperature range from −30 to 100° C., a Shore A hardness ranging from 0 to 45 at 22° C., and a Compression Set at 100° C. of less than 80, preferably less than 50.

The damping compositions of the present invention may contain plasticizers, such as rubber extending plasticizers, or compounding oils. These liquid plasticizers can be dispersed in the near-gelation crosslinked polymer-hydrogenated polymer blend in accordance with this invention. Suitable plasticizers include, for example, paraffinic oils, naphthenate oils, aromatic oils, liquid polybutenes, alkyl (or aryl) phthalates, vegetable oils, mineral oils, trimellitates, esters of polyethylene glycols, alkyl (or aryl) phosphates, methyl ester of hydrogenated wood rosin, liquid rosin oils, pine tar, polyterpenes, non-reacting liquid rubbers. Rubber compounding oils are well known in the art and include both high saturates content oils and high aromatics content oils. Preferred plasticizers are highly saturated oils, e.g. paraffin oil (PW380) made by Idemitsu Corp. of Japan. The amounts of rubber compounding oil employed in the invention composition can vary from 0 to about 500 phr(parts by weight per hundred parts by weight of rubber), preferably between about 0 to about 1000 phr, and most preferably between about 0 and about 200 phr.

The damping composition can be formulated in a solvent solution. The components of the damping composition can be dissolved in a solvent or blend of solvents. Aromatic hydrocarbon solvents such as toluene, xylene, or Shell Cyclo Sol 53 are suitable. If desired, it is usually possible to obtain lower viscosity by using a solvent blend consisting of an aromatic hydrocarbon solvent with a polar solvent. Suitable polar solvents include esters such as isopropyl acetate, ketones such as methyl isobutyl ketone, and alcohols such as isopropyl alcohol. The amount of polar solvent used depends on the particular polar solvent chosen and on the level of functionality on the functionalized hydrogenated polymer. Usually, the amount of polar solvent used is between 0 and 50% weight in the solvent blend.

The damping composition can also be formulated by dry mixing methods. The damping materials of this invention are preferably manufactured by mixing and dynamically heat-treating the components described above, namely, by melt-mixing. As for the mixing equipment, any conventional, generally known equipment such as an opentype mixing roll, closed-type Banbury mixer, closed type Brabender mixer, extruding machine, kneader, continuous mixer, or the like is acceptable. The closed-type Brabender mixer is preferable, and mixing in an inactive gas environment, such as nitrogen or argon, is also preferable.

Compositions of the present invention are typically prepared by blending the components at an elevated temperature, preferably between about 50° C. and about 200° C., until a homogeneous blend is obtained, usually less than three (3) hours. Various methods of blending are known to the art and any method producing a homogeneous blend is satisfactory. Alternatively, the ingredients may be blended into a solvent.

The gels of the present invention may have an extender added to the prepared polymers during final processing. Suitable extenders include extender oils and low molecular weight compounds or components. Suitable extender oils include those well known in the art including naphthenic, aromatic and paraffinic petroleum oils and silicone oils. The amount of the extender employed in the invention can vary from 0 to 500 phr.

Examples of low molecular weight organic compounds or components useful as extenders in the compositions of the present invention are low molecular weight organic materials having a number-average molecular weight of less than 20,000, preferable less than 10,000, and most preferably less than 5,000. Although there is no particular limitation to the material that may be employed, the following is a list of examples of appropriate materials:

(1) Softening agents, namely aromatic naphthenic and paraffinic softening agents for rubbers or resins;
(2) Plasticizers, namely plasticizers composed of esters including phthalic, mixed phthalic, aliphatic dibasic acid, glycol, fatty acid, phosphoric and stearic esters, epoxy plasticizers, other plasticizers for plastics, and phthalate, adipate, sebacate, phosphate, polyether and polyester plasticizers for NBR;
(3) Tackifiers, namely coumarone resins, coumarone-indene resins, terpene phenol resins, petroleum hydrocarbons and rosin derivative;
(4) Oligomers, namely crown ether, flourine-containing oligomers, polybutenes, xylene resins, chlorinated rubber, polyethylene wax, petroleum resins, rosin ester rubber, polyalkylene glycol diacrylate, liquid rubber (polybutadiene, styrene/butadiene rubber, butadiene-acrylonitrile rubber, polychloroprene, etc.), silicone oligomers, and poly-α-olefins;
(5) Lubricants, namely hydrocarbon lubricants such as paraffin and wax, fatty acid lubricants such as higher fatty acid and hydroxy-fatty acid, fatty acid amide lubricants such as fatty acid amide and alkylene-bis-fatty acid amide, ester lubricants such as fatty acid-lower alcohol ester, fatty acid-polyhydric alcohol ester and fatty acid-polyglycol ester, alcoholic lubricants such as fatty alcohol, polyhydric alcohol, polyglycol and polyglycerol, metallic soaps, and mixed lubricants; and,
(6) Petroleum hydrocarbons, namely synthetic terpene resins, aromatic hydrocarbon resins, aliphatic hydrocarbon resins, aliphatic cyclic hydrocarbon resins, aliphatic or alicyclic petroleum resins, aliphatic or aromatic petroleum resins, polymers of unsaturated hydrocarbons, and hydrogenated hydrocarbon resins.

Other appropriate low-molecular weight organic materials include latexes, emulsions, liquid crystals, bituminous compositions, and phosphazenes. One or more of these materials may be used as extenders.

In accordance with the present invention, the gel composition of the present invention may have added thereto about 10, preferably 30 to 1,000, parts by weight of extender per 100 parts by weight of the block copolymers. Most preferred amounts of added extender include from about 50 to about 500 parts of oil per 100 parts of block copolymer and ideally about 80 to about 300 parts of extender per 100 parts of block copolymer. The weight percent ratio of the block copolymer to the extender is from about 10:1 to about 1:100, preferably 5:1 to 1:5.

The polymer gels produced according to the present invention generally have high damping properties having a tan δ in the range of about 0.1 to about 1.0, preferably higher than 0.3 over the temperature range of −20° C. to 70° C., and a Shore A hardness ranging from 0 to about 50, preferably about 0 to about 30, most preferably about 0 to 5 at about 20° C. to 25° C. or at room temperature. The service temperature of the gels of the present invention is less than or equal to 100° C. for most of the polymers of the present invention, e.g., 100° C. compression set of the gel is about 65. Some of the extended polymers of the present invention have a potential use up to 140° C.

It is frequently desirable to include other additives well known in the rubber art to the compositions of the present application. Stabilizers, antioxidants, conventional fillers, reinforcing agents, reinforcing resins, pigments, fragrances and the like are examples of some such additives. Specific examples of useful antioxidants and stabilizers include 2-(2'-hydroxy-5'-methylphenyl) benzotriazole, nickel dibutyldithiocarbamate, zinc dibutyl dithiocarbamate, tris (nonylphenyl) phosphite, 2,6-di-t-butyl-4-methylphenol and the like. Exemplary conventional fillers and pigments include silica, carbon black, titanium dioxide, iron oxide and the like. These compounding ingredients are incorporated in suitable amounts depending upon the contemplated use of the product, preferably in the range of 1 to 350 parts of additives or compounding ingredients per 100 parts of the gel.

EXAMPLE 1

Preparation of Gelation Polymers

A near-gelation polymer was prepared using 19.7388 grams of a liquid hydroxy-terminated hydrogenated polyisoprene (or hydroxy-terminated EPR, commercial name TH-21, obtained from Kurary, Inc. of Japan) endlinked by a condensation reaction with 0.6563 grams of a difunctional crosslinking agent, toluene diisocyanate (TDI from Aldrich Chemical Company, Milwaukee, Wis.) in a ratio of $r=W_T/W_{TH-21}=0.03325$. The TDI crosslinking agent had a purity of 99% and was used without further purification. It is noted that the gelation point of this system is $r_c=W_T/W_{TH-21}=0.0333$, and the test method used to determine this point is described in the previous section. The mixtures of the crosslinking agent (TDI) and the prepolymer (TH-21) were carefully weighed into flasks on a balance with $10^{-4}$ g accuracy. Then, the mixtures were vigorously stirred at 22° C. for 30 to 60 minutes in order to dissolve the crosslinking agent into the prepolymer. The mixture was then cured at 70° C. for 3 days to finally produce a near-gelation polymer.

CONTROL EXAMPLE A

A large beverage bottle (~900 ml) was baked at 120° C. overnight in an oven and allowed to cool to 25° C. The bottle was charged with 12.0 g of hydrogenated styrene-polyisoprene-styrene triblock copolymer (SEPS, Septon 4077 from Kurary, Inc.), 12.0 g of paraffine oil (PW380 from Idemitsu Corp.) and 500 g of toluene (99.8% pure, from Fisher Scientific). The bottle was tumbled for 3 days in 80° C. water bath. The final product was isolated by drum drying the polymer cement.

EXAMPLE 2

A large beverage bottle (~900 ml) was baked at 120° C. overnight in an oven and allowed to cool to 25° C. The bottle was charged with 12.0 g of hydrogenated styrene-polyisoprene-styrene triblock copolymer (SEPS, Septon 4077), 12.0 g of paraffine oil (PW380) and 16.0 g of the polymer product from Example 1. The bottle was tumbled for 3 days in 80° C. water bath. The final product was isolated by drum drying the polymer cement.

The obtained final stock was molded into sheets and cylinder buttons at 160° C. Ring samples were cut from these sheets for tensile measurements. The detail of the physical properties of the final product are listed below:

| Example | Composition | Shore A | Compression Set[1] (70° C. at 22 hr) | Tb/Eb[2] (Psi/%) | Tan δ (5° C.) | Tan δ (25° C.) | Tan δ (50° C.) |
|---------|-------------|---------|------|------|------|------|------|
| Example A (control) | SEPS = 30% Paraffine oil = 70% | 4–5 | 23.3% | 150/1645 | 0.0436 | 0.0475 | 0.0617 |
| Example 2 | SEPS = 30% Paraffine oil = 30% Polymer of Sample 1 = 40% | 4–5 | 34.1% | 130/1714 | 0.3668 | 0.3010 | 0.2299 |

[1]The Compression Set (C.S.) was measured based on conditions of ASTM D395-89, except that the sample size and displacement were changed as follows: Sample height - 0.5 inches; Sample diameter - 0.55 inches; Displacement - Sample is compressed to 0.375 inches and stored in an oven at 70° C. for 22 hours. The sample is removed from the oven, the stress on the sample is relieved, the sample is stored at room temperature for 30 minutes and the recovery of the sample is measured as the final sample height as X in: Compression Set = ((0.5 − X)/(0.5 − 0.375)) × 100%.
[2]Ratio of tensile strength (psi) to elongation at break (%)

The gel composition of Example 2 exhibited superior damping properties compared to the damping properties of the control Example A, while other properties were maintained. FIG. 1 displays a comparison of the tan δ versus temperature for the polymers prepared in Control Example A and Example 2.

What is claimed is:

1. A high damping copolymer blend comprising:
    a hydrogenated block copolymer; and
    a near-gelation crosslinked polymer formed by reacting a functionalized prepolymer with a crosslinking agent to a physical state relative to the gelation point of the near gelation crosslinked polymer wherein the absolute value of $$\left|\frac{r - r_c}{r}\right|$$

ranges from 0 to 0.5;
        wherein r is the weight of the crosslinking agent to the functionalized prepolymer and $r_c$ is the critical ratio of the weight of the crosslinking agent to the weight of functionalized prepolymer at the gelation point.

2. The damping copolymer blend of claim 1 wherein the high damping copolymer blend has a tan δ ranging from 0.3 to 1.0 at a temperature range from −30 to 100° C.

3. The damping copolymer blend of claim 1 wherein the high damping copolymer blend has a Shore A hardness at 22° C. ranging from 0 to 45.

4. The damping copolymer blend of claim 1 wherein the high damping copolymer blend has a compression set at 70° C. of less than 80%.

5. The damping copolymer blend of claim 1 wherein the functionalized prepolymer and the crosslinking agent each contain at least two reactive functional groups independently selected from the group consisting of: hydroxy, oxirane, amino, carboxylic acid, isocyanate, oxirane and succinyl oxide.

6. The damping copolymer blend of claim 1 wherein the functionalized prepolymer has a functionality, $f_a \geq 2$ and the crosslinking agent has a functionality, $f_b \geq 2$.

7. The damping copolymer blend of claim 6 wherein the molecular weight ($M_f$) of the functionalized prepolymer per functional group is $M_f = M_n/f_a$ and is less than or equal to $M_c$; wherein $M_n$ is the number average molecular weight of the functionalized prepolymer, $f_a$ is the functionality of the functionalized prepolymer, and $M_c$ is the molecular weight of 100 repeating monomer units of the functionalized prepolymer.

8. The damping copolymer blend of claim 1 wherein the hydrogenated block copolymer is selected from the group consisting of: styrene-ethylene/butylene-styrene block copolymer, styrene-ethylene/butylene block copolymer, styrene-ethylene/propylene-block copolymer, styrene-ethylene/propylene-styrene block copolymer, styrene-ethylene/propylene-ethylene block copolymer, styrene-ethylene/butylene-ethylene block copolymer, styrene-ethylene/styrene block copolymer, ethylene-ethylene/butylene block copolymer, ethylene-ethylene/butylene/styrene block copolymer, ethylene-ethylene/butylene/styrene-ethylene block copolymer, ethylene-ethylene/butylene-ethylene block copolymer and mixtures thereof.

9. A method of making a near-gelloid composition comprising:
    (a) providing a liquid composition comprising a liquid polymer having low or no unsaturation, wherein the liquid polymer is a crosslinkable functionalized elastomeric polymer, and,
    (b) subjecting the liquid composition of (a) to a crosslinking agent to form a near-gelloid composition comprising a crosslinked polymer, said near-gelloid composition having a physical state relative to the gelation point of the crosslinked polymer wherein the absolute value of $$\left|\frac{r - r_c}{r}\right|$$

ranges from 0 to 0.5;
        wherein r is the weight ratio of the crosslinking agent to the crosslinkable functionalized elastomeric polymer and $r_c$ is the critical ratio of the weight of the crosslinking agent to the crosslinkable functionalized elastomeric polymer at the gelation point.

10. The method according to claim 9 wherein the crosslinking agent crosslinks said liquid composition to a near gelation polymer.

11. The method according to claim 9 wherein the crosslinking agent is selected from the group consisting of chemical crosslinking, radiation crosslinking, and UV crosslinking agents.

12. A method according to claim 9 wherein the crosslinking agent is a chemical crosslinking agent.

13. A method according to claim 12 wherein the chemical crosslikking agent is a reaction between reactive functional groups selected from the group consisting of hydroxy, amino, carboxylic acid, isocyanate, oxirane and succinyl oxide.

14. A method according to claim 9 wherein the liquid polymer has a molecular weight of 1000 to 10,000.

15. The damping copolymer blend of claim 7, wherein $10 \geq fa \geq 2$.

16. The damping copolymer blend of claim 7, wherein $5 \geq f_a \geq 2$.

17. The damping copolymer blend of claim 7, wherein $M_f$ ranges from 100 to 100,000.

18. The method of claim 9, wherein the molecular weight ($M_f$) of the liquid polymer per functional group is $M_f = M_n/f_a$ and is smaller or equal to $M_c$; wherein $M_n$ is the number average molecular weight of the liquid polymer, $f_a$ is the functionality of the liquid polymer, and $M_c$ is the molecular weight of 100 repeating monomer units of the liquid polymer.

19. A near-gelation crosslinked polymer formed by reacting a functionalized prepolymer with a crosslinking agent, such that the absolute value of the expression $$\left|\frac{r - r_c}{r}\right|$$

ranges from 0 to 0.5;

wherein r is the ratio of the weight of the crosslinking agent to the functionalized prepolymer and $r_c$ is the critical ratio of the weight of the crosslinking agent to the weight of the functionalized prepolymer at the gelation point of the reacted functionalized prepolymer and crosslinking agent.

20. The near-gelation crosslinked polymer of claim 19, wherein the absolute value of $$\left|\frac{r - r_c}{r}\right|$$

ranges from 0 to about 0.2.

* * * * *